United States Patent [19]

Balfanz et al.

[11] 4,022,704

[45] May 10, 1977

[54] PRODUCTION OF SPRAY DRIED, HIGH BULK DENSITY HYDROUS SODIUM SILICATE MIXTURES

[75] Inventors: Wayne J. Balfanz, New City, N.Y.; Joseph S. Steinreich, Olympia Fields, Ill.

[73] Assignee: Stauffer Chemical Company, Westport, Conn.

[22] Filed: June 21, 1971

[21] Appl. No.: 155,346

[52] U.S. Cl. .................................. 252/135; 252/99; 252/109; 252/174; 159/48 R; 423/265; 423/275; 423/332; 423/334
[51] Int. Cl.² ...................... B01D 1/16; C11D 7/14; C11D 11/02
[58] Field of Search ............. 252/99, 135, 539, 174; 23/332, 333, 334; 159/48 R; 423/332, 333, 334, 265, 275

[56] References Cited

UNITED STATES PATENTS

| | | | |
|---|---|---|---|
| 3,055,835 | 9/1962 | Monick | 252/539 |
| 3,133,024 | 5/1964 | Feierstein et al. | 252/135 X |
| 3,247,122 | 4/1966 | Schaafsma et al. | 252/135 |
| 3,247,123 | 4/1966 | Schrager et al. | 252/135 |
| 3,674,700 | 7/1972 | Gaiser | 252/135 |
| 3,708,427 | 1/1973 | Jakobi et al. | 252/99 |
| 3,709,837 | 1/1973 | Weldes | 252/135 X |

OTHER PUBLICATIONS

"Soluble Silicates as Detergent Builders" by A. Warren, reprinted from *Soap & Chemical Specialties,* 1963, 6 pages.

*Primary Examiner*—Dennis L. Albrecht
*Attorney, Agent, or Firm*—Daniel S. Ortiz

[57] ABSTRACT

There is disclosed a process for increasing the output of high bulk density, hydrous sodium silicate which may be obtained by the spray drying of its aqueous solutions. This process involves the addition of certain additives to the aqueous sodium silicate solutions prior to their being spray dried.

15 Claims, No Drawings

PRODUCTION OF SPRAY DRIED, HIGH BULK DENSITY HYDROUS SODIUM SILICATE MIXTURES

Background of the Invention

As is known to those skilled in the art, the designation "sodium silicate" is actually used to identify a variety of compounds which range in chemical composition from $Na_2O.4SiO_2$ to $2Na_2O.SiO_2$ most of which are produced by the fusion of silica, i.e. sand, and sodium carbonate, i.e. soda ash. By properly proportioning the reactants, the ratio of the constituent parts, i.e. the $Na_2O$ and $SiO_2$, may be varied in order to obtain a number of desired properties. Sodium silicates, varying in ratio from $Na_2O.1.6SiO_2$ to $Na_2O.4SiO_2$, are known as colloidal silicates. These are generally sold as 20 to 50 percent aqueous solutions called water glass. They are so named because they solidify to a glass that is water-soluble.

Sodium metasilicate ($Na_2SiO_3$) has the ratio of $Na_2O.SiO_2$ and is a definite crystalline compound which forms various hydrates. Substances having higher sodium oxide content are sodium sesquisilicate $4(2Na_2O.S_1O_2$ Thus, the more siliceous sodium silicates are glasses, typical noncrystalline solid solutions, which are important mostly for their adhesive and binding properties. The more alkaline silicates, including sodium metasilicate, are crystalline materials with definite structures and characteristic properties. These are used chiefly as cleaners and detergents.

In manufacturing sodium silicates, selected proportions of sand and sodium carbonate are charged, batchwise, in a regenerative tank furnace resembling that used for the manufacture of glass. Fuel gas, e.g. producer, coke-oven, or natural, and air are mixed, preheated, and burned to maintain oven temperatures of about 2,200° to 2,600° F. in the hot zone. The melted materials gradually flow through the furnace evolving carbon dioxide. There is a normal shrinkage, approximately 10 percent in the weight of the charge, due to the loss of gases and volatilization of alkali oxides.

The fused melt is drawn from the furnace continuously or periodically as a thin stream. This is solidified by passage onto a moving chilled conveyor of steel molds, in which the melt cools to a semi-transparent solid. If the hot melt is sprayed with a stream of cold water, it is shattered into fragments. The resulting fragments may then be charged into grinding and screening equipment so as to yield granular sodium silicates which may then be utilized in a wide variety of end-use applications. However, as thus produced, these granular materials are usually difficult to dissolve in water. Therefore, in order to obtain the sodium silicates in a more readily soluble form, the shattered fragments obtained by spraying the hot melt with cold water are passed into a rotary dissolver. Here the solid material is dissolved by superheated (80 psi) steam. Alternatively, the hot melt from the furnace can be passed directly into water where it is dissolved with steam. The resulting solution is clarified by settling in a tank and is then adjusted to the desired specific gravity which will usually range from about 22° to 69° Be. with 50° Be. being the most common.

The thus prepared solutions are then used to prepare hydrated sodium silicates which are far more easily dissolved than the above described essentially anhydrous, granular materials. This subsequent drying operation may, in turn, be accomplished by the use of various types of apparatus, although the use of spray drying equipment is often favored for this purpose. Spray dryers are well known in the art and are characterized by their employment of an atomizing device which disperses the liquid feed stock into a spray of droplets ranging in diameter from about 10 to 600 microns depending upon the type of atomizer used as well as the capacity and atomizing conditions. Hot gases, which may be introduced by means of a variety of gas-inlet configurations, contact the spray and evaporate moisture from the individual drops. The mixture of hot gases and dry particles is then separated so as to obtain the desired product in a finely divided form.

In most instances, a so called spinning-disc atomizer will be used for the spray drying of sodium silicate solutions. These atomizers consist of a disc or a wheel-like impeller rotating in a horizontal plane. Liquid fed to the center of the rotating disc is flung off at high velocity at the periphery. The disc action for producing sprays consists largely of the creation and attenuation of liquid films or ligaments as a result of rapid acceleration of the liquid as it flows radially outward from the center. Discs may operate over a wide range of conditions as follows: disc diameter, 2–36 inches; disc speed, 500–75,000 rpm; liquids atomized, clear solutions to heavy pastes.

Although the utilization of spray drying equipment for the preparation of dry, powdered sodium silicate has many advantages, such usage is, however, accompanied by a particularly troublesome problem relating to the bulk density of the resulting dry product. Thus, for most purposes, it is desired that the powdered sodium silicate have a rather high bulk density in the range of from about 0.45 to 1.0 gms/cc. At a bulk density substantially below the minimum level of the latter range, the powdered sodium silicate is very difficult to handle since it is excessively light and fluffy and its shipping costs are, therefore, very high.

However, in the process of spray drying aqueous, sodium silicate solutions, the capacity, i.e. the permissible feed rate, of the dryer increases as the inlet temperature, i.e. the temperature of the heated gases at the inlet of the dryer is raised. On the other hand, the use of a high inlet temperature in order to obtain a high output of the dried product results in the preparation of a product having a low bulk density as a result of the fact that the bulk density of the dried sodium silicate becomes progressively lower as the inlet temperature is raised. Thus, the practitioner is forced to substantially reduce the output of the spray drying apparatus by lowering the inlet temperature of the dryer in order to produce a dry, powdered sodium silicate having a bulk density which is high enough for commercial acceptance.

Still another problem involved in the spray drying of sodium silicate solutions is the need for having to control the process conditions within very narrow limits. For example, in some instances, the dryer can become "glassed up" as a result of the fusion of the partially dried sodium silicate particles into a solid, glasslike mass which is exceedingly difficult to remove.

Thus, it is the prime object of this invention to provide a means for affecting the spray drying of aqueous sodium silicate solutions which will produce the desired dry, powdered material in an acceptably high bulk density range while permitting the dryer to operate at a high capacity. A further object involves providing a means for affecting the spray drying of aqueous sodium silicate solutions over a wide range of processing conditions than has heretofore been possible. Various other objects and advantages of this invention will be apparent from a reading of a disclosure which follows hereinafter.

TECHNICAL DISCLOSURE OF THE INVENTION

It has now, surprisingly, been found that by incorporating one or more additives, as described below, into an aqueous sodium silicate solution, it is possible to spray dry the thus treated solution so as to prepare dry, powdered, hydrous sodium silicate having a bulk density of at least about 0.45 gms/cc. while running the spray dryer at a high inlet temperature which permits it to operate at a high capacity. Moreover, the use of these additives has also been found to have the effect of permitting the spray drying of aqueous sodium silicate solutions to be carried out under a wide range of processing conditions in contrast to the rather narrow limits which were previously required.

The additives applicable for use in the process of this invention may be selected from the group consisting of alkali metal, i.e. potassium, lithium and preferably sodium, carbonates, sesquicarbonates, sulfates, chlorides, borates and tripolyphosphates. From the latter group of compounds, optimum results are obtained by the use of sodium carbonate, sodium sesquicarbonate and sodium sulfate.

The aqueous sodium silicate solutions may contain from about 10 to 55%, by weight, of sodium silicate in which the $SiO_2$:-$Na_2O$ ratio may range from about 1:1 to 3.4:1. These solutions may have a specific gravity of from about 20° to 70° Be. Preferred conditions involve the use of a solution containing about 20%, by weight, of a sodium silicate having a $SiO_2$:$Na_2O$ ratio of about 2:1.

With respect to proportions, one or more of the above described additives should be added to the aqueous sodium silicate solution in a concentration of from about 5 to 100%, by weight, of the sodium silicate solids in the solution. However, optimum results appear to be obtained by the use of about 80 to 100%, by weight, of the selected additive.

The actual admixture of the additive with the aqueous sodium silicate solution may be accomplished by simply introducing the additive and proceeding to affect its dissolution by the application of agitation and/or heating to a temperature of from about 50° to 100° C. If desired, the resulting mixture may be prepared so as to be in the form of a slurry wherein portions of the additive remain undissolved. The preparation of these mixtures in the form of slurries is often desirable since it permits a higher concentration of the additive to be used and also requires the removal of less water during the subsequent spray drying operation.

Any type of spray drying apparatus may be employed in the process of this invention. Thus, one can employ spray dryers equipped with centrifugal-pressure nozzels, pneumatic atomizers, impingement nozzles or, most preferably, spinning-disc atomizers of the type described hereinabove. The selected spray dryer may be operated at an inlet temperature which, because of the presence of the additives of this invention, is substantially higher than would be possible under conditions where an additive is not present in the sodium silicate solution while nonetheless producing the dry product at an acceptably high bulk density of at least about 0.45 gms/cc and, preferably, of from about 0.64 to 0.80 gms/cc. Thus, suitable inlet temperatures may range from about 300° to 450° C. in the process of this invention. By contrast, in the absence of one of these additives in the solution, the dry, powdered sodium silicate obtained at an inlet temperature of 300° C. would have the undesirably, low bulk density of about 0.05 gms/cc. The precise inlet temperature which is utilized in the process of this invention will be dependent upon the particular additive which is employed as well as on the concentration in which it is present in the system. The residence time within the dryer can be in the range of from about 3 to 60 seconds, with a period of about 15 seconds being preferred. Suitable outlet temperatures are in the range of from about 110° to 130° C. with optimum results being obtained at a temperature of about 120° C. However, it is to be stressed that both the residence time and the outlet temperature are not critical factors with respect to the process of this invention inasmuch as it is the use of high inlet temperatures in combination with the above described additives which makes it possible to obtain hydrous sodium silicate having a high bulk density while operating the spray dryer at a high capacity.

It is seen, therefore, that the subject invention makes it possible for the practitioner to conduct the spray drying operation under a wide range of processing conditions, e.g. an inlet temperature range of from about 300 to 450° C., an outlet temperature range of from about 110° to 130° C. and a residence period in the dryer of from about 3 to 60 seconds. This is in striking contrast to the range of process conditions required for spray drying sodium silicate solutions in the absence of the additives of this invention whereby the inlet temperature range is from about 160° to 200° C. and the outlet temperature range is from about 115° to 125° C.

As has already been noted, the ability to employ high inlet temperatures in the process of this invention makes it possible to substantially increase the output of the spray dryer. For example, by using an inlet temperature of 400° C., it is possible to produce up to five times as much product having a bulk density of about 0.48 gms/cc. as compared to using the identical spray dryer, without any additives in the feed solution, at an inlet temperature of about 170° C. in order to maintain the bulk density of the resulting product at a suitably high level of about 0.55 gms/cc The mode of action of the above described additives in the process of this invention is thought to involve their ability to provide a channel which, despite the use of high inlet temperatures, permits the escape of water vapor from the atomized droplets of sodium silicate without the occurrence, or at least with a substantial reduction, of the so-called "bubbling" effect.

Thus, when high inlet temperatures are utilized, the atomized droplets formed from sodium silicate solutions which do not contain one of the additives of this invention will undergo a very rapid dehydration. This rapid dehydration results in the dried droplets having very thin shells with large volume, hollow cores which thereby accounts for their low bulk density. However, in the subject process, the presence of the additive in the sodium silicate solution make it easier for the vaporized water to escape during the high temperature dehydration of the atomized particles leading to the development of dried particles with thicker walls and smaller cores which, needless to say, have a relatively high bulk density as compared with dried particles having thin walls and large cores.

In addition to the ease with which the process of this invention permits the high volume preparation of dry, powdered sodium silicate having a high bulk density, it should also be noted that various other properties of the thus produced product are also improved upon. Thus, the rate of solution as well as the hydroscopicity of the dry sodium silicate resulting from this process are distinctly better than the pure, hydrous sodium silicate obtained from the spray drying of solutions which do not contain one of the additives whose use is required in the process of this invention.

The dry, powdery particles, each of which comprises an intimate mixture of sodium silicate with one or more of the above described additives, which result from this novel process are particularly suited for use in the formulation of soap and detergent products. However, they may also be employed in all of the other end use applications wherein dry sodium silicates are normally utilized including, for example, in adhesives, drilling muds, binders for foundry cores and molds, waterproofing mortars and cements, impregnating woods, soil solidification and drilling, catalysts, silica gels and the bleaching and sizing of textiles and paper, etc.

The following examples will further illustrate the embodiment of this invention. In these examples all parts given are by weight unless otherwise noted.

EXAMPLE I

This example illustrates how increasing the inlet temperature during the spray drying of various unmodified aqueous sodium silicate solutions makes it possible to increase the feed rate of these solutions into the dryer while resulting in an undesirable decrease in the bulk density of the resulting spray dried products.

The sodium silicate in each of the solutions whose composition is given in Table 1, hereinbelow, has a $SiO_2/Na_2O$ ratio of 2:1. Prior to being fed into the spray drier, these solutions are heated to a temperature of about 60° C. Solutions No. 1–6 are spray dried in a 30 inches diameter pilot plant spray over a residence time of about 3 seconds, while solutions No. 7–9 are spray dried in a 40 inch diameter commercial spray dryer operating at an outlet temperature of about 120° C. and a residence time of 45 seconds. Both of these dryers are equipped with spinning-disc atomizers. Table I also describes the composition of the feed, the feed rate, the inlet and outlet temperatures and the bulk density of each of the resulting spray dried products.

TABLE I

| Solution No. | Feed Composition (Wt.%) Sodium Silicate | H₂O | Feed Rate (ml/min) | Inlet Temp (° C) | Outlet Temp. ° C. | Bulk Density (gm/cc) |
|---|---|---|---|---|---|---|
| 1 | 37 | 63 | 60 | 110 | 72 | 0.86 |
| 2 | 44 | 63 | 130 | 160 | 110 | 0.82 |
| 3 | 37 | 63 | 145 | 170 | 104 | 0.76 |
| 4 | 37 | 63 | 185 | 200 | 118 | 0.67 |
| 5 | 40 | 60 | 200 | 210 | 128 | 0.54 |
| 6 | 37 | 63 | 240 | 300 | 160 | 0.05 |
| 7 | 40 | 60 | 3.5 gpm | 165 | 122 | 0.56 |
| 8 | 40 | 60 | 4.3 gpm | 175 | 123 | 0.45 |
| 9 | 40 | 60 | 6.0 gpm | 200 | 125 | 0.24 |

EXAMPLE II

This example illustrates how the addition of one of the novel additives of this invention, i.e. sodium sulfate, to aqueous sodium silicate solutions makes it possible to spray dry the thus modified solutions at high inlet temperatures so as to be able to achieve high feed rates while still obtaining the resulting dried product at a bulk density which is commercially acceptable.

The sodium silicate in each of the solutions whose composition is given in Table 2, hereinbelow, has a $SiO_2/Na_2O$ ratio of 2:1. In preparing these solutions, the sodium sulfate additive is introduced, with agitation, into the sodium silicate solution after it has been heated to a temperature of about 70° C. In this manner, the sodium sulfate additive is either fully or partially dissolved in the sodium silicate solution. This product is then cooled down to a temperature of about 60° C. prior to being fed into the spray dryer. Solutions Nos. 1–7 (a–c) are then spray dried in a 30 inches diameter pilot plant spray dryer operating over a residence time of 3 seconds while solutions Nos. 8(a–c) are spray dried in a 40 inch commercial spray drying unit. These driers are equipped with a spinning-disc atomizer. Table 2 also describes the composition of the feed, the feed rate, the inlet and outlet temperatures and the bulk density of each of the resulting spray dried products.

TABLE 2

| Solution No. | Feed Composition (wt %) Sodium Sulfate | Sodium Silicate | Water | Feed Rate (Ml/min) | Inlet Temp (° C) | Approx. Outlet Temp (° C) | Bulk Density (gms/cc) |
|---|---|---|---|---|---|---|---|
| 1a | 4 | 36 | 60 | 120–150 | 165 | 120 | 0.78 |
| 1b | 4 | 36 | 60 | 120–150 | 200 | 140 | 0.20 |
| 1c | 4 | 36 | 60 | 120–150 | 240 | 160 | 0.10 |
| 2a | 10 | 30 | 60 | 120–150 | 180 | 130 | 0.80 |
| 2b | 10 | 30 | 60 | 120–150 | 225 | 160 | 0.38 |
| 2c | 10 | 30 | 60 | 120–150 | 270 | 175 | 0.15 |
| 3a | 16 | 24 | 60 | 120–150 | 170 | 115 | 0.84 |
| 3b | 16 | 24 | 60 | 120–150 | 260 | 160 | 0.73 |
| 3c | 16 | 24 | 60 | 120–150 | 340 | 215 | 0.35 |
| 4a | 17.5 | 17.5 | 65 | 100 | 175 | 140 | 0.80 |
| 4b | 17.5 | 17.5 | 65 | 185 | 235 | 165 | 0.80 |
| 4c | 17.5 | 17.5 | 65 | 200 | 310 | 195 | 0.80 |
| 5a | 17.5 | 17.5 | 65 | 125 | 170 | 115 | 0.80 |
| 5b | 17.5 | 17.5 | 65 | 150 | 290 | 185 | 0.70 |
| 5c | 17.5 | 17.5 | 65 | 125 | 400 | 240 | 0.60 |

TABLE 2-continued

| Solution No. | Feed Composition (wt %) | | | Feed Rate (Ml/min) | Inlet Temp (° C) | Approx. Outlet Temp (° C) | Bulk Density (gms/cc) |
|---|---|---|---|---|---|---|---|
| | Sodium Sulfate | Sodium Silicate | Water | | | | |
| 6a * | 22 | 22 | 56 | 100 ml/min. | 180 | 125 | 0.90 |
| 6b * | 22 | 22 | 56 | 120 ml/min. | 250 | 165 | 0.60 |
| 6c * | 22 | 22 | 56 | 120 ml/min. | 350 | 225 | 0.54 |
| 7a * | 12.5 | 37 | 50 | 70 ml/min. | 180 | 130 | 0.80 |
| 7b * | 12.5 | 37 | 50 | 70 ml/min. | 250 | 170 | 0.30 |
| 7c * | 12.5 | 37 | 50 | 100 ml/min. | 350 | 220 | 0.20 |
| 8a * | 19 | 19 | 62 | 9 gal/min. | 180 | 120 | 0.65 |
| 8b * | 19 | 19 | 62 | 26 gal/min. | 300 | 122 | 0.52 |
| 8c * | 19 | 19 | 62 | 39 gal/min. | 390 | 125 | 0.54 |

* Part of the sodium sulfate remains in the solid phase so that the feed of the spray dryer is in the form of a light slurry.

The above data clearly indicate the need for using the selected additive at a concentration above the required minimum of at least about 5%, by weight, of the sodium silicate so as to thereby obtain the the resulting product at a bulk density of at least about 0.45 gm/cc.

EXAMPLE III

This example illustrates the use of a variety of different additives alone, and in combination, in carrying out the novel process of this invention.

The sodium silicate used, the procedure followed in introducing the additive to the solution, the type of spray dryer utilized, its outlet temperature and type of atomizer are all as described in Example II. Table 3, hereinbelow, describes the additives used, the composition of the feed, the feed rate, the inlet temperature and the bulk density of each of the resulting spray dried products.

The above data reveal that superior results are obtained in the process of this invention by the respective use, as additives, of sodium carbonate, sodium tripolyphosphate and sodium chloride as compared with the use of either sodium tripolyphosphate or sodium chloride.

EXAMPLE IV

This example illustrates the use, in the process of this invention, of a number of sodium silicates having a variety of different SiO₂/Na₂O ratios.

The procedure followed in introducing the additive to the solution, the type of spray dryer utilized, its outlet temperature and type of atomizer are all as described in Example II. Table 4, hereinbelow, describes the $SiO_2/Na_2O$ ratios of the various sodium silicates used, the composition of the feed, the feed rate, the inlet temperature and the bulk density of each of the resulting spray dried products.

TABLE 3

| Solution No. | FEED COMPOSITION (Wt. %) | | | | | | | Feed Rate (ml/min) | Inlet Temp. (° C) | Outlet Temp. (° C) | Bulk Density (gms/cc) |
|---|---|---|---|---|---|---|---|---|---|---|---|
| | Sodium Carbonate | Sodium Sesqui-Carbonate | Sodium Sulfate | Sodium Silicate | Sodium Tripoly Phosphate | Sodium Chloride | Water | | | | |
| 1 | 9 | — | — | 33 | — | — | 58 | 125 | 185 | 120 | 0.98 |
| 2a | 10 | — | — | 30 | — | — | 60 | 125 | 175 | 125 | 0.77 |
| 2b | 10 | — | — | 30 | — | — | 60 | 125 | 260 | 165 | 0.43 |
| 2c | 10 | — | — | 30 | — | — | 60 | 125 | 350 | 220 | 0.15 |
| 3a | 17.5 | — | — | 17.5 | — | — | 65 | 125 | 170 | 110 | 0.75 |
| 3b | 17.5 | — | — | 17.5 | — | — | 65 | 125 | 260 | 160 | 0.50 |
| 3c | 17.5 | — | — | 17.5 | — | — | 65 | 125 | 360 | 220 | 0.44 |
| 4a | — | 14 | — | 21 | — | — | 65 | 125 | 175 | 110 | 0.83 |
| 4b | — | 14 | — | 21 | — | — | 65 | 125 | 250 | 135 | 0.70 |
| 4c | — | 14 | — | 21 | — | — | 65 | 125 | 360 | 180 | 0.44 |
| 5a | — | 20 | — | 20 | — | — | 60 | 125 | 185 | 125 | 0.72 |
| 5b | — | 20 | — | 20 | — | — | 60 | 125 | 215 | 145 | 0.65 |
| 5c | — | 20 | — | 20 | — | — | 60 | 125 | 320 | 185 | 0.57 |
| 6a | 8.75 | — | 8.75 | 17.5 | — | — | 65 | 125 | 175 | 120 | 0.81 |
| 6b | 8.75 | — | 8.75 | 17.5 | — | — | 65 | 125 | 260 | 170 | 0.60 |
| 6c | 8.75 | — | 8.75 | 17.5 | — | — | 65 | 125 | 340 | 220 | 0.39 |
| 7b | — | — | — | 17.5 | 17.5 | — | 65 | 125 | 235 | 140 | 0.23 |
| 7c | — | — | — | 17.5 | 17.5 | — | 65 | 125 | 295 | 180 | 0.02 |
| 8a | — | — | — | 16 | — | 16 | 68 | 125 | 170 | 140 | 0.62 |
| 8b | — | — | — | 16 | — | 16 | 68 | 125 | 215 | 210 | 0.33 |
| 8c | — | — | — | 16 | — | 16 | 68 | 125 | 400 | 300 | 0.35 | resulting spray dried products.

TABLE 4

| Solution No. | Feed Composition (Wt. %) | | | | SiO₂/ Na₂O Ratio | Feed Rate (ml/min) | Inlet Temp. (° C) | Outlet Temp. (° C) | Bulk Density (gms/cc) |
|---|---|---|---|---|---|---|---|---|---|
| | Sodium Sesqui-carbonate | Sodium Sulfate | Sodium Silicate | Water | | | | | |
| 1a | — | — | 40 | 60 | 1.6:1 | 125 | 170 | 120 | 0.02 |
| 1b | — | — | 40 | 60 | 1.6:1 | 125 | 260 | 170 | 0.04 |
| 1c | — | — | 40 | 60 | 1.6:1 | 125 | 340 | 220 | 0.04 |
| 2a | 20 | — | 20 | 60 | 1.6:1 | 125 | 180 | 120 | 0.84 |
| 2b | 20 | — | 20 | 60 | 1.6:1 | 125 | 250 | 165 | 0.60 |
| 2c | 20 | — | 20 | 60 | 1.6:1 | 125 | 350 | 250 | 0.43 |
| 3a | — | — | 38 | 62 | 1:1 | 125 | 205 | 165 | 0.78 |
| 3b | — | — | 38 | 62 | 1:1 | 125 | 240 | 185 | 0.06 |
| 3c | — | — | 38 | 62 | 1:1 | 125 | 290 | 210 | 0.03 |
| 4a | — | 17 | 17 | 66 | 1:1 | 125 | 175 | 140 | 0.86 |
| 4b | — | 17 | 17 | 66 | 1:1 | 125 | 250 | 190 | 0.80 |

TABLE 4-continued

| Solution No. | Feed Composition (Wt. %) | | | | SiO$_2$/ Na$_2$O Ratio | Feed Rate (ml/min) | Inlet Temp. (° C) | Outlet Temp. (° C) | Bulk Density (gms/cc) |
|---|---|---|---|---|---|---|---|---|---|
| | Sodium Sesqui- carbonate | Sodium Sulfate | Sodium Silicate | Water | | | | | |
| 4c | — | 17 | 17 | 66 | 1:1 | 125 | 330 | 240 | 0.36 |

Variations may be made in proportions, procedures and materials without departing from the scope of this invention as defined in the following claims.

What is claimed is:

1. In a process for spray drying an aqueous sodium silicate composition consisting essentially of from about 10 to about 55 percent by weight of sodium silicate having an SiO$_2$:Na$_2$O ratio of from about 1:1 to 3.4:1 by dispersing the aqueous sodium silicate composition in the form of droplets into a heated gas stream and contacting the droplets with the heated gas stream for a sufficient length of time to form a dry, hydrous, powdered sodium silicate composition having a bulk density of at least about 0.64 gms/cc., and containing from 50 to about 95 percent by weight of the solids in the dry powdery hydrous sodium silicate composition of sodium silicate, the improvement which comprises: admixing with the aqueous sodium silicate from about 5 percent to 100 percent by weight of the sodium silicate of at least one additive selected from the group consisting of alkali metal carbonates, sesquicarbonate, sulfates, chlorides, borates and tripolyphosphates whereby the inlet gas temperature of the spray dryer can be increased and the capacity of the spray dryer for producing dry, powdery, hydrous sodium silicate having a bulk density from about 0.64 to about 0.80 gms/cc. is increased.

2. The process of claim 1, wherein said additive is selected from the group consisting of the alkali metal carbonates, sesquicarbonates, and sulfates.

3. The process of claim 2, wherein said additive is selected from the group consisting of sodium carbonate, sodium sesquicarbonate and sodium sulfate.

4. The process of claim 1, wherein the aqueous mixture resulting from the admixture of said additive with said aqueous sodium silicates solution is in the form of a solution.

5. The process of claim 1, wherein the aqueous mixture resulting from the admixture of said additive with said aqueous sodium silicate solution is in the form of a slurry wherein a portion of said additive remains undissolved.

6. The process of claim 1, wherein said aqueous solution of sodium silicate contains about 20%, by weight, of sodium silicate.

7. The process of claim 1, wherein said additive is admixed with said aqueous sodium silicate solution in a concentration of from about 80 to 100%, by weight, of said sodium silicate.

8. The process of claim 1, wherein said sodium silicate has a SiO$_2$:Na$_2$O ratio of about 2:1.

9. The process of claim 1, wherein said spray dryer is equipped with a spinning-disc atomizer.

10. The process of claim 1, wherein the inlet temperature in said spray dryer is in the range of from about 300° to 450° C.

11. The product resulting from the process of claim 1, comprising dry, powdery particles having a bulk density of about 0.64 to 0.80 gms/cc. each of which comprises an intimate mixture of hydrous sodium silicate and at least one additive selected from the group consisting of the alkali metal carbonates, sesquicarbonates, sulfates, chlorides, borates and tripolyphosphates.

12. The product of claim 11, wherein said additive is selected from the group consisting of the alkali metal carbonates, sesquicarbonates and sulfates.

13. The product of claim 12, wherein said additive is selected from the group consisting of sodium carbonate, sodium sesquicarbonate and sodium sulfate.

14. The product of claim 11, wherein said sodium silicate has a SiO$_2$:Na$_2$0 ratio of about 2:1.

15. The product of claim 11, wherein each of said particles contains from about 80 to 100%, by weight, of said additive.

* * * * *

UNITED STATES PATENT AND TRADEMARK OFFICE
CERTIFICATE OF CORRECTION

PATENT NO. : 4,022,704
DATED : May 10, 1977
INVENTOR(S) : Wayne J. Balfanz, Joseph S. Steinreich It is certified that error appears in the above-identified patent and that said Letters Patent are hereby corrected as shown below:

Col. 1, line 25, the formula "4(2Na$_2$O.S$_1$O$_2$" should read --(1.5Na$_2$O·SiO$_2$)-- ;

Col. 1, line 25, after the formula "(1.5Na$_2$O·SiO$_2$)" add the following words --and sodium orthosilicate, Na$_4$SiO$_4$-(2Na$_2$O·S$_1$O$_2$). --

Col. 3, lines 59-60, the word "nozzels" should read --nozzles-- .

Col. 6, Table I, Solution No. 2, under heading "H$_2$O" the figure "63" should read --56-- .

Col. 7, Table 3, Solution 7a has been omitted from this Table, please insert as follows: "7a; -- ; -- ; -- ; 17.5; 17.5; --; 65; 125; 175; 115; 0.78".

Signed and Sealed this

First Day of November 1977

[SEAL]

Attest:

RUTH C. MASON
Attesting Officer

LUTRELLE F. PARKER
Acting Commissioner of Patents and Trademark